United States Patent
James

[11] 3,882,905
[45] May 13, 1975

[54] REINFORCING CAGE
[75] Inventor: Kenneth E. James, Denver, Colo.
[73] Assignee: Stressed Pipe Research, Inc., Englewood, Colo.
[22] Filed: July 29, 1974
[21] Appl. No.: 492,424

Related U.S. Application Data
[62] Division of Ser. No. 340,019, March 12, 1973, Pat. No. 3,841,356.

[52] U.S. Cl. ............... 140/92.1; 140/3 C; 140/71 R; 140/111
[51] Int. Cl. ....... B21f 3/04; B21f 15/04; B21f 27/02
[58] Field of Search ................. 138/172, 175, 176; 140/3 R, 3 C, 107, 111, 112, 113, 71 R, 92.1; 245/2; 264/228

[56] References Cited
UNITED STATES PATENTS

| | | | |
|---|---|---|---|
| 982,485 | 1/1911 | Eberlein | 140/3 R |
| 1,830,202 | 11/1931 | Jenkins | 138/175 |
| 3,437,114 | 4/1969 | Whitacre et al. | 140/112 |
| 3,592,243 | 7/1971 | Fukushima et al. | 140/112 |

FOREIGN PATENTS OR APPLICATIONS

| | | | |
|---|---|---|---|
| 798,309 | 7/1958 | United Kingdom | 138/172 |

*Primary Examiner*—C. W. Lanham
*Assistant Examiner*—E. M. Combs
*Attorney, Agent, or Firm*—Sheridan, Ross & Fields

[57] ABSTRACT

Reinforcing cage for the wall of a concrete pipe characterized by a pair of helical spaced coils, indexed 180° apart, and longitudinal members woven over and under adjacent coils and mechanically locked thereto, said members being disposed angularly to the planes of the ends of the cage, forming isosceles triangles for resisting torsion in both directions about the cage axis, together with method of making the cage. Various additional optional features may be employed.

5 Claims, 11 Drawing Figures

PATENTED MAY 13 1975 3,882,905

REINFORCING CAGE

This is a division, of application Ser. No. 340,019, filed Mar. 12, 1973, now U.S Pat. No. 3,841,356.

BACKGROUND OF THE INVENTION

Concrete pipe employed in water distribution systems and the like, due to its relatively poor strength in tension, is conventionally steel reinforced with rods or wire extending circumferentially which is subjected to hoop tension and other rods or wire extending longitudinally which are subjected to tension in a direction parallel with the pipe axis. Expansive concrete is now widely used which, upon curing, causes a pipe section to enlarge slightly in diameter and increase in length which stresses all of the steel bonded within its wall in tension. This in turn, pre-stresses the concrete in compression which increases the strength of the pipe to resist internal pressure. Thus, when pressurized, the concrete may still be in compression, under which it has its maximum strength, or may be stressed in tension only to an extent well within its tensile strength limitations. U.S. Pat. No. 3,520,968 to Kreston is exemplary of the construction referred to which discloses circumferential and longitudinal reinforcing members which pre-stress the concrete in compression. One of the difficulties with such construction and others similar thereto is that the reinforcing members, which form a cage, provide little torsional strength to the cage during the handling thereof or to the pipe section during its use. Also, to provide a stable cage during handling and casting of the concrete it is essential that the crossing members be secured together at many points which is time consuming and costly of manufacture. Further, if smooth wire or rod is employed for the longitudinal reinforcing, it is difficult to obtain the requisite bond between same and the concrete, which problem was recognized in the patent referred to.

SUMMARY OF THE INVENTION

The present invention provides an improved reinforcing cage for concrete pipe which obviates disadvantages of the prior art which, in its broader aspects, is characterized by two helical coils indexed 180°, similar to the threads of a double thread screw, and longitudinal reinforcing members which extend angularly to the planes of the ends of the cage in right and left hand directions. These provide inherently rigid triangles to resist torque in both of opposite directions. They are interwoven over and under the two coils referred to so they are locked therebetween without need of welds or ties at points of crossing. Additionally, they are distorted into longitudinal serpentines which serve to improve the locks and longitudinal bond and better absorb shear stresses between same and the concrete, as distinguished from straight smooth members which tend to slip relative to the concrete during the expansive curing. The triangles are isosceles shaped with respect to their bases at the ends of the cage and, if suitably overlapped, may cross forming an X-shaped pattern. Optional additional features include non-angular longitudinal members inside or outside of the cage or both, interwoven members, or bars having bond strength since each longitudinal member is mechanically locked along its length to the two coils.

In accordance with the foregoing, the principal objects of the invention are to provide improved concrete pipe reinforcing cages which are inherently strong to resist hoop tension, longitudinal tension and torque in both of opposite directions about its axis.

Another object is to provide improved concrete pipe employing such cages.

Another object is to provide improved bond between longitudinally extending reinforcing and the concrete.

Another object is to provide a cage, the various parts of which may be locked together with simple bends or mechanical fasteners, obviating or minimizing welds, wire ties, or the like.

A further object is to provide novel methods of fabricating the cage.

Still further objects, advantages, and salient features will become more apparent from the detailed description to follow, the appended claims, and the accompanying drawing to now be briefly described.

DETAILED DESCRIPTION OF PREFERRED EMBODIMENTS

Figure 2:
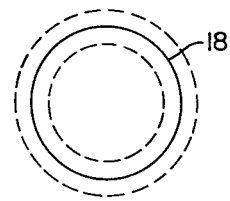
FIG. 2 is an end elevation as viewed in the direction of arrow 2, FIG. 1.
Figure 3:
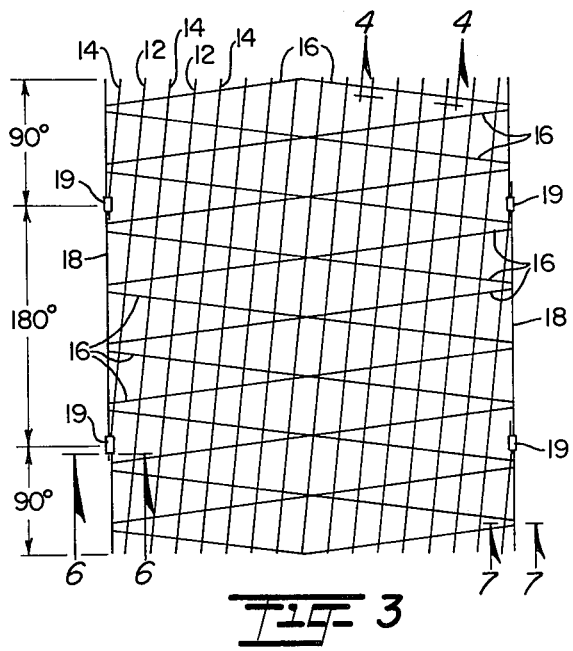
FIG. 3 is a plan of the cage of FIG. 1 as developed to planar form.
Figure 4:
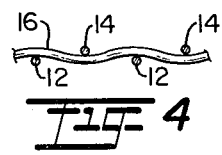
FIG. 4 is a section taken on line 4—4, FIG. 3.

Referring now to the drawing, and first to FIGS. 1 to 4, the subject of the invention comprises a cylindrical cage formed of a first strand 12, wound as a coil having spaced convolutions, a second like coil 14, the convolutions of which are disposed between the convolutions of the first coil, and angularly disposed strands 16 which are woven over and under adjacent coils 12, 14, as best shown in FIG. 4. The construction, as just briefly described, may be better understood by a description of a preferred method of making same, to now be described.

Figure 1:
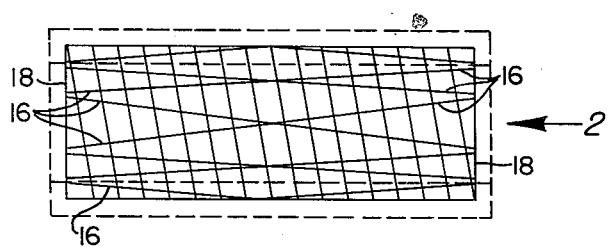
FIG. 1 is a side elevation of a reinforcing cage, a concrete pipe in which it is embedded being shown by dotted lines.
Figure 6:
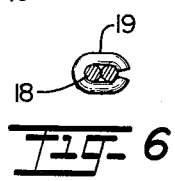
FIG. 6 is a section taken on line 6—6 of FIG. 3.
Figure 7:
FIG. 7 is a section taken on line 7—7, FIG. 1.

A suitable collapsible rotatable mandrel (now shown) may be provided onto which strand material may be fed to form spaced convolutions similar to the method of making coil springs with spaced convolutions. The free end of strand 12 is first temporarily affixed to the mandrel and then wound onto the mandrel one full turn. The free end is then affixed to the running portion of the strand to form a planar end ring 18. At the point of affixation the strand 12 commences as a helical coil of desired axial length. The running portion is then severed from the supply of strand material and affixed in like manner to form another planar end ring 18 at the other end. Strands 16 are then laid on top of the coil just described in a desired configuration and their ends temporarily secured to the mandrel. As illustrated in FIGS. 1 and 2, strands 16 are in pairs, forming isosceles triangles, the end rings forming the bases thereof. Also, adjacent legs of adjacent triangles cross each other midway between the end rings to form X configurations. The end of strand 14 is next affixed to an end ring at a point 180° to the point of affixation of strand 12, as previously described. It then starts a helical coil and continues to the opposite end ring to which it is affixed in the same manner as described for strand 12. The second strand 14 thus lies on top of all of angularly extending reinforcing members 16 and the convolutions are also disposed axially midway between the convolutions of the first strand 12, this arrangement being analogous to the configuration of a double thread in which the lead is twice the pitch (distance between adjacent threads). An important feature in the second strand 14 is that it be maintained under sufficient tension to bend members 16 into a sinuous or serpentine form as best shown in FIG. 4. The hills and valleys thus formed, lock the first and second strands in predetermined axially spaced relationship equal to the pitch therebetween. The opposite free ends of each member may then be secured to the end rings by hook shaped bends 17 and the assembly removed from the mandrel after collapsing same. A hook shaped bend 17, as just referred to, is illustrated in FIG. 7 and one manner of securing the first coil together to form end ring 18 is illustrated in FIG. 6, wherein a U-shaped clip 19 is compressed around the strand.

Figure 3A:
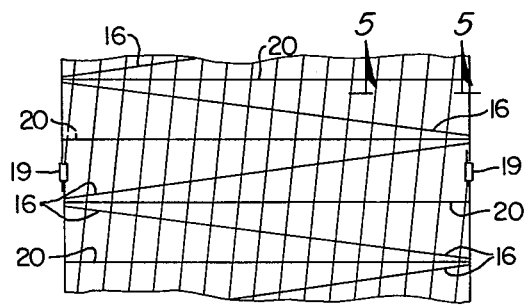
FIG. 3A is a like partial development of an alternative form of the invention.

Referring now to FIG. 3A, strands 12, 14 are wound in the same manner as previously described. Two variants are illustrated which may be employed singly or in combination. Firstly, strands 16 do not cross as shown in FIG. 3, and secondly, additional reinforcing strands 20 are provided which extend parallel to the axis of the cage. As will be apparent, these may be employed with the FIG. 3 construction when desired. Strands 20 may be affixed to the cage in various manners to now be described.

Figure 5:
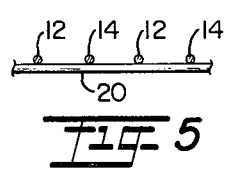
FIG. 5 is a longitudinal section, similar to FIG. 4, illustrating additional reinforcing disposed inside the cage coils and extending parallel to the axis thereof.
Figure 5A:
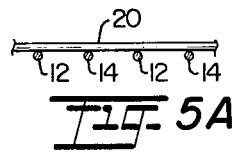
FIG. 5A is a like section, illustrating the additional reinforcing disposed outside of the cage coils.
Figure 5B:
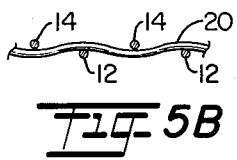
FIG. 5B is a like section, illustrating the additional reinforcing woven between the cage coils.

Referring to FIG. 5, strands 20 may be disposed inside the cage after it has been removed from the mandrel and their ends bend around the end rings as previously described. In the FIG. 5A construction strands 20 are disposed outside the cage and their ends secured to the end rings in like manner. FIG. 5B differs essentially from FIGS. 5 and 5A in that strands 20 are woven over and under adjacent convolutions 12, 14. As will be apparent, in this construction these strands are disposed on top of the first coil after it has been formed on the mandrel in the same manner as member 16, the difference being that they are disposed parallel with the cage axis rather than helically therearound.

Figure 5C:
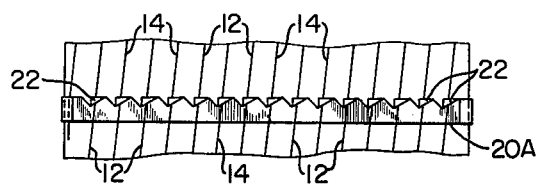
FIG. 5C is a like section, illustrating the additional reinforcing as bars having appreciable cross wire holding ability to maintain precise spacing of the circumferential coils because preformed serrated projections may be mechanically locked to each of the cage coils.

FIG. 5C illustrates another form of longitudinal reinforcing members 20A formed as a flat bar which is so punched to provide tabs or serrations 22 which may be bent around coils 12, 14. As illustrated, such bar is disposed inside the cage but may be disposed outside thereof if so desired. The number of angularly spaced bars employed around the cage, as with the number of strands 20, may be selected as desired, depending upon design considerations, some of which will now be described.

As previously referred to, the pre-stressing of expansible concrete pipe is well known as exemplified by the Kreston patent wherein reinforcing circumferential steel is provided to increase the stress limit of the concrete in radical directions (hoop tension) and also longitudinal steel for reinforcing in the longitudinal or axial direction. Such steel, however, has little or no substantial effect on torsional strength of the pipe which is essentially shear in a plane perpendicular to the pipe axis. The difficulty of obtaining adequate bond between the longitudinal steel and concrete has been recognized, such as disclosed in the Kreston patent. It will now become apparent that an important and generic concept of the present invention provides greatly improved torsional resistance of the cage (and consequently the pipe) in both of opposite directions by reason of the angular relationship of reinforcing members 16. Additionally, the proposed arrangement of woven longitudinal wires provides improved bond to the concrete for transferring longidutinal stress by reason of the undulations therein as contrasted to straight and smooth rods which tend to slip relative to the concrete. Additionally, the undulations mechanically lock the several components of the cage in predetermined relationship to prevent movement from their optimum positions during handling, such as transport, and during the casting operation.

The selection of the particular cage features, or combination thereof, as disclosed in the several modifications, will usually be a matter of engineering selection taking into consideration the factors of expected stresses and economy of manufacture. In general, the circumferential steel will first be selected to provide the requisite hoop tension resistance which involves selection of steel diameter and pitch of the coils. An angular configuration of members 16 would normally be next selected, both as to steel diameter and number of such elements required to resist both applied torsion and the longitudinal prestressing forces. These members are, of course, placed in state of tension as the concrete expands and thus resist the torsional shear; they also are subjected to components of stress in the axial direction. In some instances they may be so selected that they resist the combined stresses in which case axial longitudinal members 20 may be omitted. In some instances, and particularly where torsional requirements are relatively low, it may be found more economical to add members 20 rather than to design angular members 16 to withstand both torsional and longitudinal stresses.

What is claimed is:

1. A method of making a reinforcing cage, circular in cross section, for use within the wall of cylindrical concrete pipe, comprising the steps of:
   a. winding a first strand of reinforcing material, such as steel wire or rod, around a circular mandrel to form a first coil axially spaced convolutions;
   b. disposing longitudinally extending pairs of like strands on top of the first coil at angular positions therearound and in a configuration such that each pair forms right and left hand helices;
   c. winding a second like strand to form a second coil, the convolutions of which are disposed between the convolutions of the first coil, the winding being under sufficient tension to distort the longitudinally extending strands at their points of crossing with both coils into a generally sinusoidal form having valleys therealong, the valleys forming locks to maintain the two coils in axially spaced relationship; and d. securing the ends of the two coils together to form an end ring at each end of the cage.

2. A method in accordance with claim 1 wherein the pairs of longitudinal strands are disposed such that a strand of one pair crosses a strand of another pair at a point between the ends of the cage.

3. A method in accordance with claim 1 wherein the longitudinal strands are disposed such that strands of adjacent pairs are in non-crossing relationship.

4. A method in accordance with claim 1 including the step of securing further strands to the cage in positions parallel to the axis thereof.

5. A method in accordance with claim 4 including the further step of distorting said further strands into a generally sinusoidal form having valleys therealong, the valleys forming locks to further maintain the two coils in axially spaced relationship and for improving the bond to the concrete for resisting longitudinal stress therein.

* * * * *